US010642575B2

(12) United States Patent
Taki et al.

(10) Patent No.: US 10,642,575 B2
(45) Date of Patent: May 5, 2020

(54) INFORMATION PROCESSING DEVICE AND METHOD OF INFORMATION PROCESSING FOR NOTIFICATION OF USER SPEECH RECEIVED AT SPEECH RECOGNIZABLE VOLUME LEVELS

(71) Applicant: SONY CORPORATION, Tokyo (JP)

(72) Inventors: Yuhei Taki, Kanagawa (JP); Shinichi Kawano, Tokyo (JP); Kunihito Sawai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 15 days.

(21) Appl. No.: 15/521,322

(22) PCT Filed: Aug. 21, 2015

(86) PCT No.: PCT/JP2015/073488
§ 371 (c)(1),
(2) Date: Sep. 18, 2017

(87) PCT Pub. No.: WO2016/088410
PCT Pub. Date: Jun. 9, 2016

(65) Prior Publication Data
US 2018/0150279 A1 May 31, 2018

(30) Foreign Application Priority Data
Dec. 2, 2014 (JP) .................................. 2014-243906

(51) Int. Cl.
G10L 15/00 (2013.01)
G06F 3/16 (2006.01)
(Continued)

(52) U.S. Cl.
CPC ............. G06F 3/167 (2013.01); G06F 3/048 (2013.01); G06F 3/1423 (2013.01); G06T 7/70 (2017.01);
(Continued)

(58) Field of Classification Search
USPC .................................. 704/231–257, 270–275
See application file for complete search history.

(56) References Cited

U.S. PATENT DOCUMENTS 7,260,538 B2 * 8/2007 Calderone .................. 348/14.05
7,908,146 B2 * 3/2011 Kaneko .................. G10L 15/22
704/275
(Continued)

FOREIGN PATENT DOCUMENTS

CN 104054039 A 9/2014
CN 104077105 A 10/2014
(Continued)

OTHER PUBLICATIONS

Extended European Search Report of EP Patent Application No. 15866106.6, dated May 4, 2018, 7 pages.
(Continued)

Primary Examiner — Jesse S Pullias
(74) Attorney, Agent, or Firm — Chip Law Group

(57) ABSTRACT

To provide a technology capable of allowing a user to find whether speech is uttered with a volume at which speech recognition can be performed. Provided is an information processing device including: a determination portion configured to determine a user-uttered speech volume on the basis of input speech; and a display controller configured to control a display portion so that the display portion displays a display object. The display controller causes the display portion to display a first motion object moving toward the display object when the user-uttered speech volume exceeds a speech recognizable volume.

19 Claims, 15 Drawing Sheets

(51) Int. Cl.
  *G06F 3/048* (2013.01)
  *G06T 7/70* (2017.01)
  *G06F 3/14* (2006.01)
  *G10L 25/27* (2013.01)
  *H04N 5/247* (2006.01)
  *G10L 17/00* (2013.01)

(52) U.S. Cl.
  CPC .............. *G10L 25/27* (2013.01); *H04N 5/247* (2013.01); *G10L 17/005* (2013.01)

(56) References Cited

U.S. PATENT DOCUMENTS

| | | | | |
|---|---|---|---|---|
| 8,069,041 | B2* | 11/2011 | Kuboyama | G10L 15/22 |
| | | | | 348/565 |
| 8,121,846 | B2* | 2/2012 | Reichardt | G11B 27/105 |
| | | | | 704/275 |
| 8,175,885 | B2* | 5/2012 | Sureka | G10L 15/193 |
| | | | | 704/251 |
| 9,020,825 | B1* | 4/2015 | Garber | G06F 3/167 |
| | | | | 704/231 |
| 2003/0095212 | A1* | 5/2003 | Ishihara | G08C 23/04 |
| | | | | 348/734 |
| 2012/0316876 | A1 | 12/2012 | Jang et al. | |
| 2013/0182858 | A1 | 7/2013 | You et al. | |
| 2014/0304605 | A1 | 10/2014 | Ohmura et al. | |

FOREIGN PATENT DOCUMENTS

| | | |
|---|---|---|
| CN | 104169837 A | 11/2014 |
| EP | 2802962 A1 | 11/2014 |
| JP | 11-352995 A | 12/1999 |
| JP | 2000-000377 A | 1/2000 |
| JP | 2001-079265 A | 3/2001 |
| JP | 2006-227499 A | 8/2006 |
| JP | 2007-329702 A | 12/2007 |
| JP | 2011-227199 A | 11/2011 |
| JP | 2014-203207 A | 10/2014 |
| JP | 2015-510629 A | 4/2015 |
| JP | 5996669 B2 | 9/2016 |
| KR | 10-2014-0117369 A | 10/2014 |
| WO | 2012/169679 A1 | 12/2012 |
| WO | 2013/106133 A1 | 7/2013 |

OTHER PUBLICATIONS

International Search Report and Written Opinion of PCT Application No. PCT/JP2015/073488, dated Sep. 29, 2015, 2 pages of English Translation and 9 pages of ISRWO.

Office Action for CN Patent Application No. 201580057995.8, dated Aug. 5, 2019, 06 pages of Office Action and 09 pages of English Translation.

Office Action for CN Patent Application No. 201580057995.8, dated Dec. 4, 2019, 07 pages of Office Action and 12 pages of English Translation.

Van Veen, et al., "Beamforming: A Versatile Approach to Spatial Filtering", IEEE Assp Magazine, vol. 5, No. 2, XP011437205, April, 1, 1988, pp. 04-24.

Office Action for EP Patent Application No. 15866106.6, dated Mar. 11, 2020, 09 pages of Office Action.

* cited by examiner

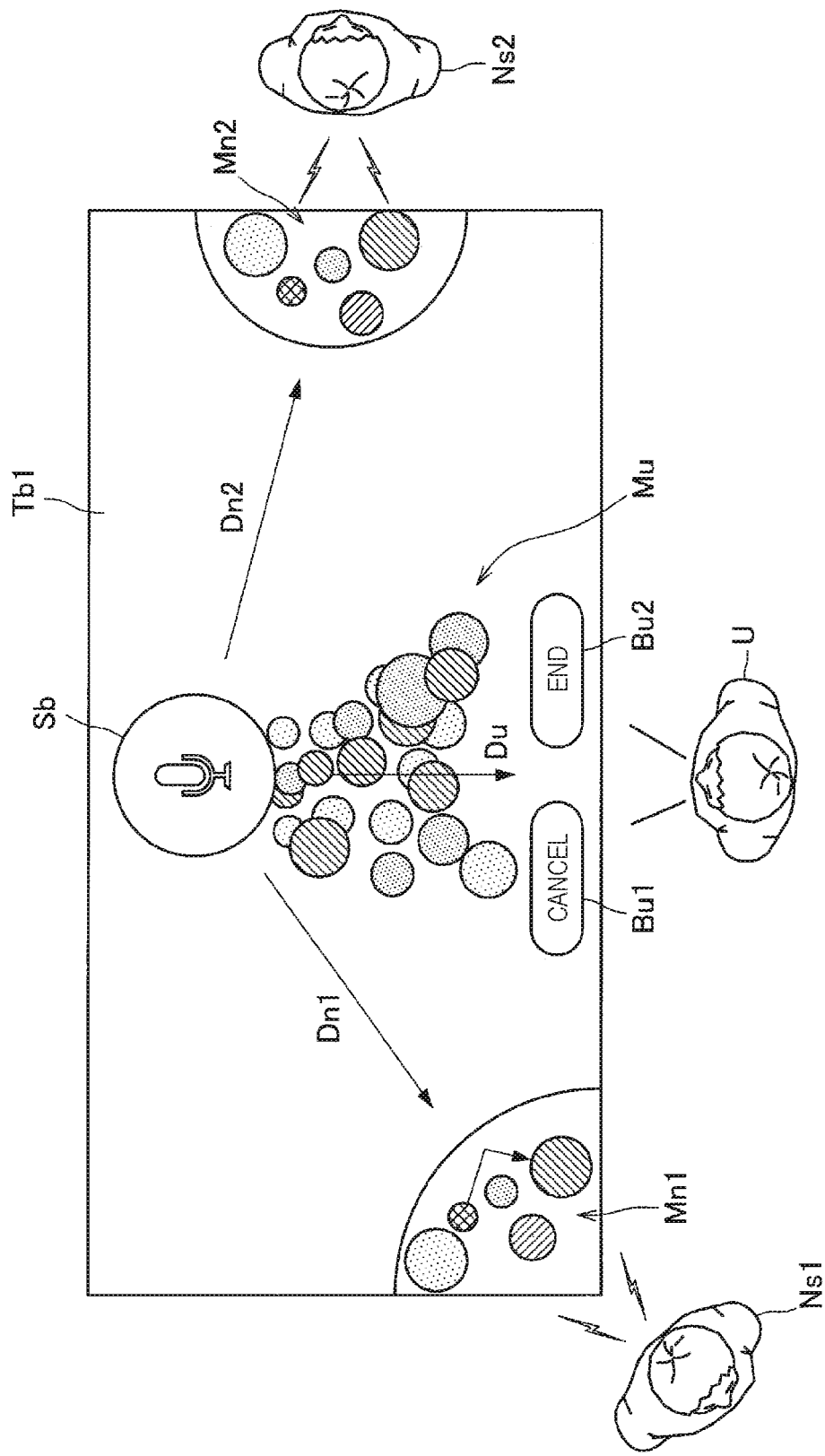

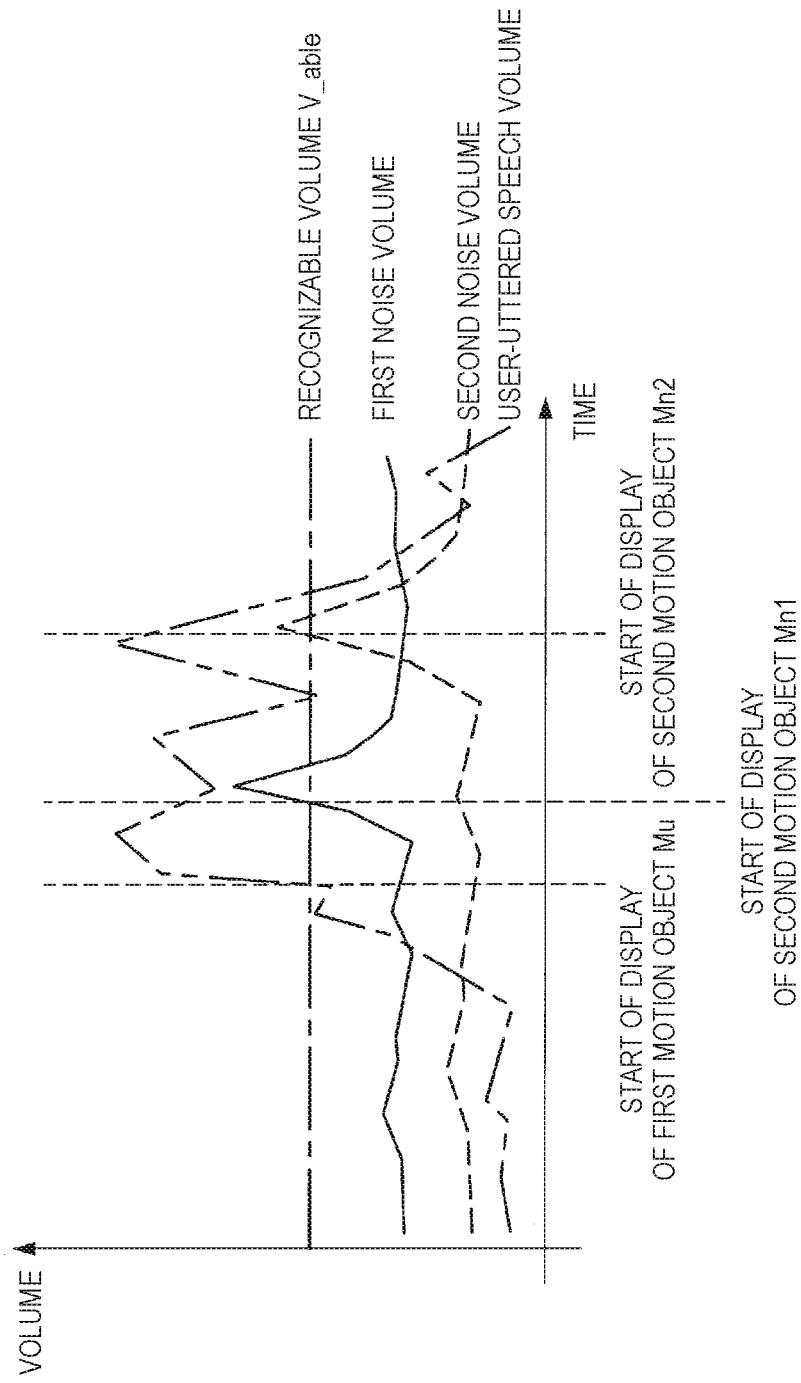

INFORMATION PROCESSING DEVICE AND METHOD OF INFORMATION PROCESSING FOR NOTIFICATION OF USER SPEECH RECEIVED AT SPEECH RECOGNIZABLE VOLUME LEVELS

CROSS REFERENCE TO RELATED APPLICATIONS

This application is a U.S. National Phase of International Patent Application No. PCT/JP2015/073488 filed on Aug. 21, 2015, which claims priority benefit of Japanese Patent Application No. JP 2014-243906 filed in the Japan Patent Office on Dec. 2, 2014. Each of the above-referenced applications is hereby incorporated herein by reference in its entirety.

TECHNICAL FIELD

The present disclosure relates to an information processing device, a method of information processing, and a program.

BACKGROUND ART

Technologies for accepting speech uttered from a user as input speech and performing speech recognition on the input speech to recognize a string from input speech have been recently developed. In one example, a technique allowing a user to find that a mode in which speech recognition is performed on input speech is started has been developed (e.g., see Patent Literature 1).

CITATION LIST

Patent Literature

Patent Literature 1: JP 2013-025605A

DISCLOSURE OF INVENTION

Technical Problem

However, it is desirable to provide a technology capable of allowing a user to find whether speech is uttered with a volume at which speech recognition can be performed.

Solution to Problem

According to the present disclosure, there is provided an information processing device including: a determination portion configured to determine a user-uttered speech volume on the basis of input speech; and a display controller configured to control a display portion so that the display portion displays a display object. The display controller causes the display portion to display a first motion object moving toward the display object when the user-uttered speech volume exceeds a speech recognizable volume.

According to the present disclosure, there is provided a method of information processing, the method including: determining a user-uttered speech volume on the basis of input speech; and controlling a display portion so that the display portion displays a display object. The display portion is caused to display a first motion object moving toward the display object when the user-uttered speech volume exceeds a speech recognizable volume.

According to the present disclosure, there is provided a program for causing a computer to function as an information processing device including: a determination portion configured to determine a user-uttered speech volume on the basis of input speech; and a display controller configured to control a display portion so that the display portion displays a display object. The display controller causes the display portion to display a first motion object moving toward the display object when the user-uttered speech volume exceeds a speech recognizable volume.

Advantageous Effects of Invention

According to the present disclosure as described above, there is provided a technology capable of allowing a user to find whether speech is uttered with a volume at which speech recognition can be performed. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is a diagram illustrating another example of a screen displayed by the display portion.

FIG. 9 is a diagram illustrated to describe the start of display of a second motion object.

MODE(S) FOR CARRYING OUT THE INVENTION

Figure 1:
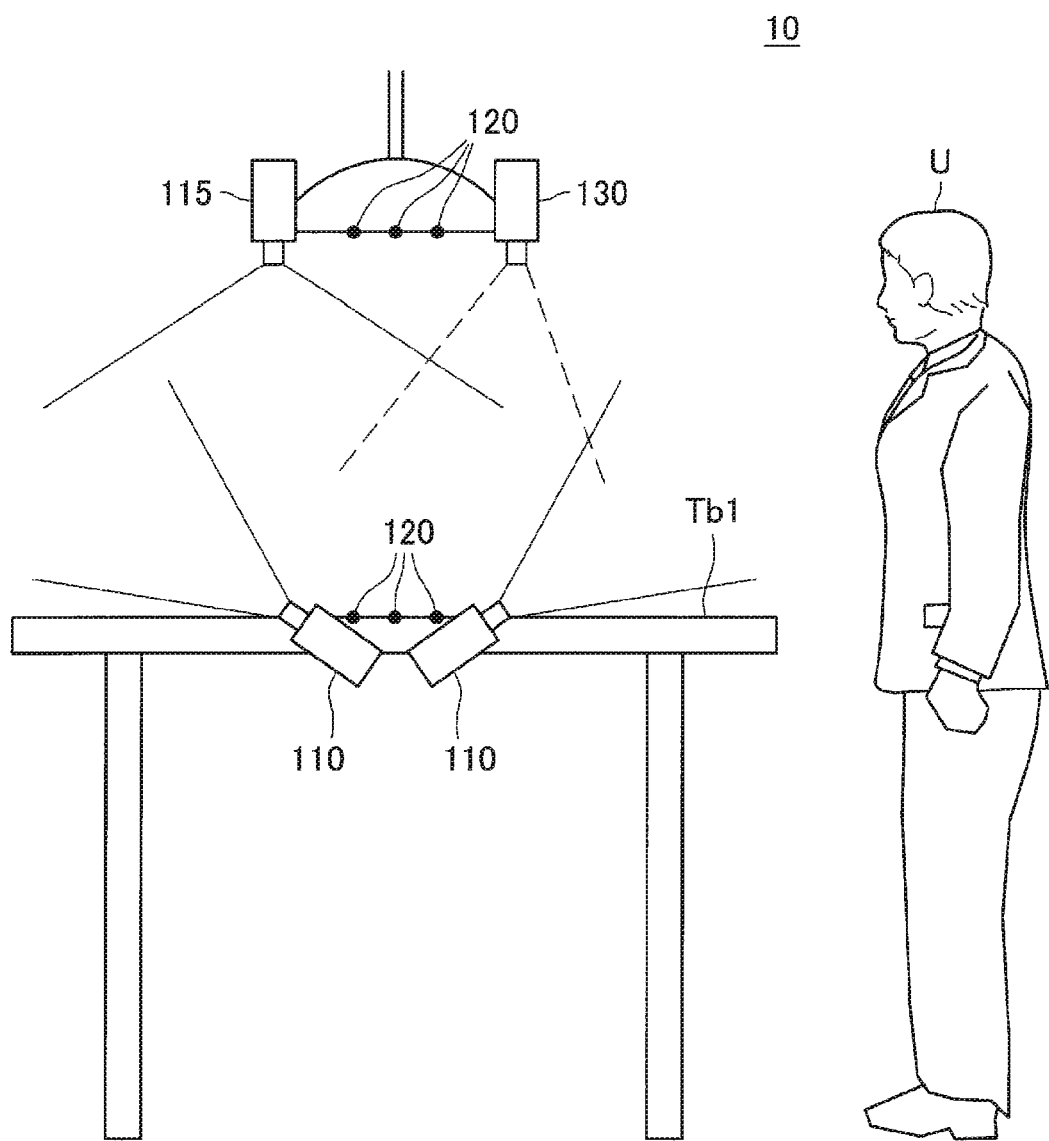
FIG. 1 is a diagram illustrating a configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Moreover, the description will be given in the following order.
1. Embodiment of present disclosure
1.1. System configuration example
1.2. Functional configuration example
1.3. Display of first motion object
1.4. Setting of recognizable volume
1.5. Display of second motion object
1.6. Example of operation
1.7. Modified example of display form
1.8. Hardware configuration example
2. Conclusion

1. EMBODIMENT OF PRESENT DISCLOSURE

[1.1. System Configuration Example]

A configuration example of an information processing system 10 according to an embodiment of the present disclosure is described with reference to the drawings. FIG. 1 is a diagram illustrating a configuration example of the information processing system 10 according to an embodiment of the present disclosure. As illustrated in FIG. 1, the information processing system 10 according to the embodiment of the present disclosure is configured to include an image input portion 110, an operation input portion 115, a speech input portion 120, and a display portion 130. The information processing system 10 is capable of performing speech recognition on the speech uttered by a user U (hereinafter also simply referred to as "user").

The image input portion 110 has a function of inputting an image. In the example illustrated in FIG. 1, the image input portion 110 includes two cameras embedded in a table Tbl. However, the number of cameras included in the image input portion 110 is not limited to the particular number as long as it is one or more. In such a case, the position where each of one or more cameras included in the image input portion 110 is provided is also not limited to a particular position. In addition, one or more cameras may include a monocular camera or a stereo camera.

The operation input portion 115 has a function of inputting an operation of the user U. In the example illustrated in FIG. 1, the operation input portion 115 includes one camera suspended from the ceiling above the table Tbl. However, the position at which the camera included in the operation input portion 115 is provided is not limited to a particular position. In addition, the camera may include a monocular camera or a stereo camera. In addition, the operation input portion 115 may be anything other than a camera as long as it has a function of inputting the operation of the user U, and may be, for example, a touch panel or a hardware button.

The display portion 130 has a function of displaying a screen on the table Tbl. In the example illustrated in FIG. 1, the display portion 130 is suspended from the ceiling above the table Tbl. However, the position at which the display portion 130 is provided is not limited to a particular position. In addition, the display portion 130 may typically be a projector capable of projecting a screen onto the top surface of the table Tbl, but it may be other types of display as long as it has a function of displaying a screen.

Moreover, although the case where the top surface of the table Tbl is the display surface of the screen is mainly described herein, the display surface of the screen may be other than the top surface of the table Tbl. An example of the display surface of the screen may include a wall, a building, a floor surface, a ground surface, a ceiling, or a surface at other place. In addition, in the case where the display portion 130 has its own display surface, the display surface of the screen may be a display surface of the display portion 130.

The speech input portion 120 has a function of inputting speech. In the example illustrated in FIG. 1, the speech input portion 120 includes a total of six microphones, that is, three microphones above the table Tbl and three microphones present on the upper surface of the table Tbl. However, the number of microphones included in the speech input portion 120 is not limited to the particular number as long as it is one or more. In such a case, the position where one or more microphones included in the speech input portion 120 are provided is also not limited to a particular position. However, if the speech input portion 120 includes a plurality of microphones, the direction of the sound source can be estimated on the basis of the speech that is input to each of the plurality of microphones. In addition, if the speech input portion 120 includes a microphone having directivity, the direction of the sound source can be estimated on the basis of the speech that is input to the directional microphone.

The above description is given as to the configuration example of the information processing system 10 according to an embodiment of the present disclosure.

[1.2. Functional Configuration Example]

Figure 2:
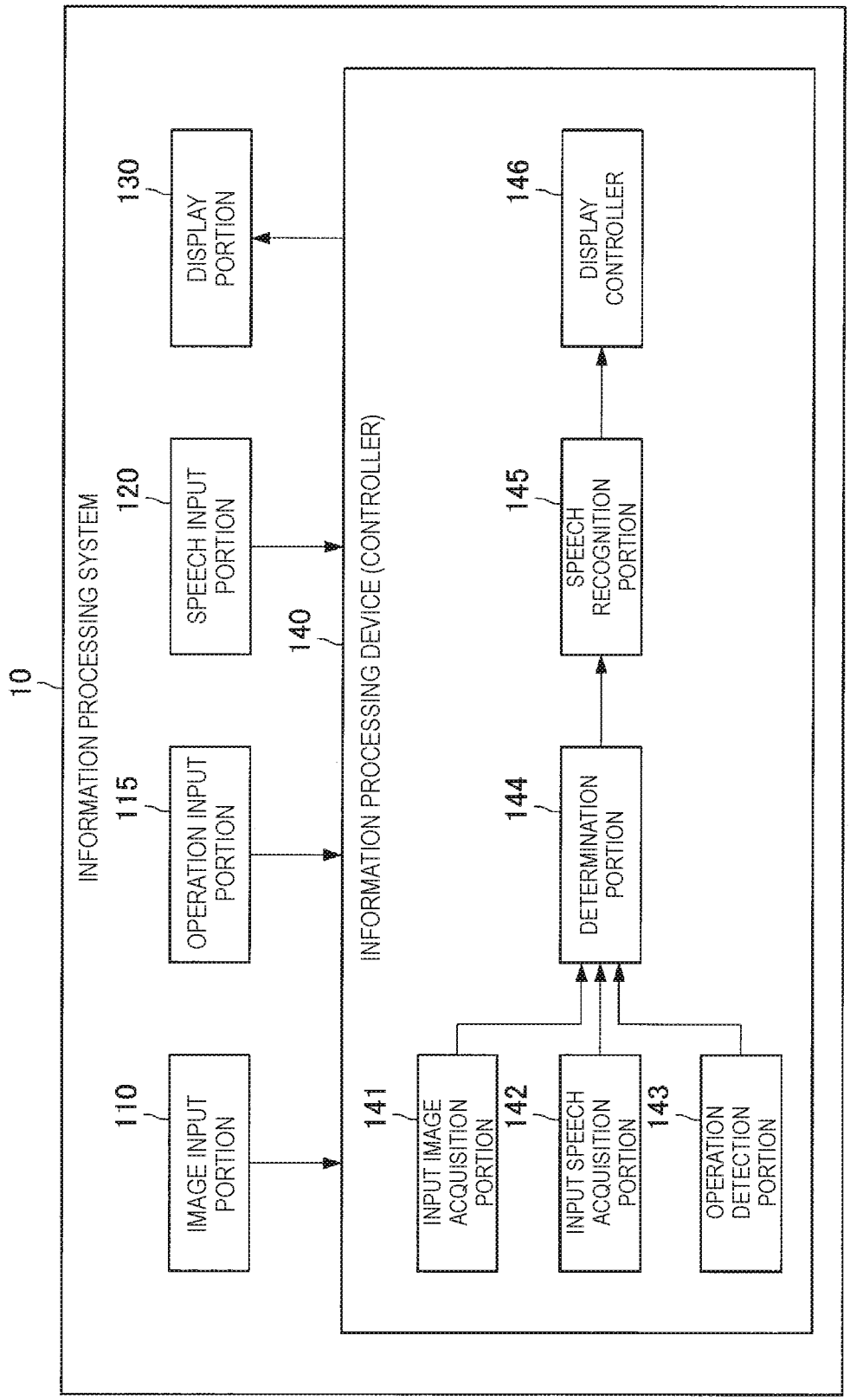
FIG. 2 is a block diagram illustrating a functional configuration example of the information processing system according to the embodiment.

Subsequently, a functional configuration example of the information processing system 10 according to an embodiment of the present disclosure is described. FIG. 2 is a block diagram illustrating a functional configuration example of the information processing system 10 according to an embodiment of the present disclosure. As illustrated in FIG. 2, the information processing system 10 according to an embodiment of the present disclosure is configured to include the image input portion 110, the operation input portion 115, the speech input portion 120, the display portion 130, and an information processing device 140 (hereinafter also referred to as "controller 140").

The information processing device 140 controls each component of the information processing system 10. In one example, the information processing device 140 generates information to be output from the display portion 130. In addition, in one example, the information processing device 140 incorporates the information, which is input by each of the image input portion 110, the operation input portion 115, and the speech input portion 120, in the information to be output from the display portion 130. As illustrated in FIG. 2, the information processing device 140 is configured to include an input image acquisition portion 141, an input speech acquisition portion 142, an operation detection portion 143, a determination portion 144, a speech recognition portion 145, and a display controller 146. Details of each of these functional blocks will be described later.

Moreover, the information processing device 140 may be composed of, for example, a central processing unit (CPU). In the case where the information processing device 140 is composed of a processing device such as CPU, this processing device can be composed of an electronic circuit.

The above description is given as to the functional configuration example of the information processing system 10 according to an embodiment of the present disclosure.

[1.3. Display of First Motion Object]

Figure 3:
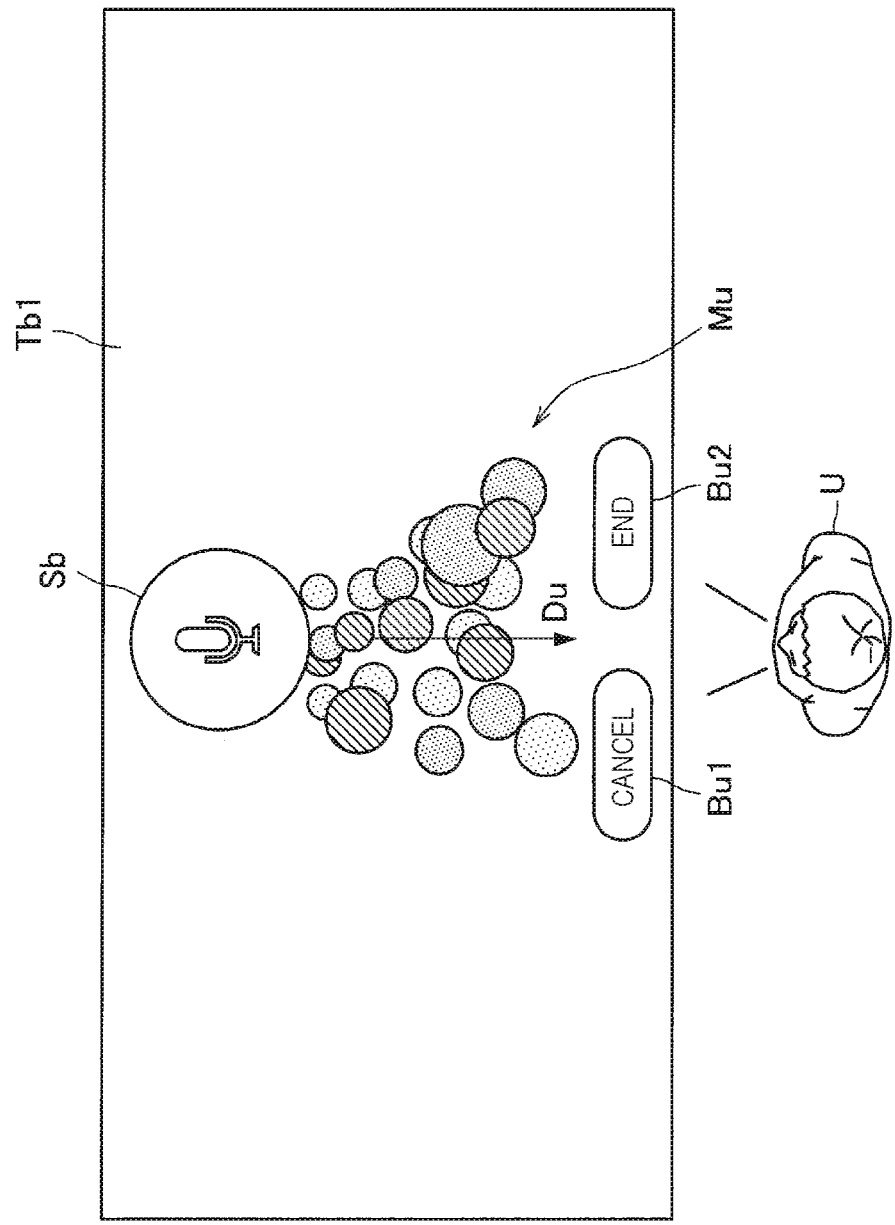
FIG. 3 is a diagram illustrating an example of a screen displayed by a display portion.

If the operation detection portion 143 detects an operation of selecting a speech recognition start object (not shown), the speech recognition portion 145 starts speech recognition on input speech. FIG. 3 is a diagram illustrating an example of a screen displayed by the display portion 130. Referring to FIG. 3, the display controller 146 causes a speech recognition cancel operation object Bu1, a speech recognition end operation object Bu2, and a display object Sb to be displayed. The speech recognition cancel operation object Bu1 is an object for accepting an input of an operation for canceling speech recognition. The speech recognition end operation object Bu2 is an object for accepting an input of an operation for terminating speech recognition.

The display object Sb is not limited to a particular one as long as it is an object that can be recognized visually by the user. In one example, the display object Sb may be a stationary object or a moving object. If the speech recognition is started, the determination portion 144 determines the volume of speech uttered by the user U on the basis of the input speech. In this regard, the way of determining the user-uttered speech volume is not limited to a particular way. In one example, the determination portion 144 may estimate a user-uttered speech source direction Du, and may determine a volume input from the user-uttered speech source direction Du as the user-uttered speech volume. Moreover, a way of estimating the user-uttered speech source direction Du is also not limited to a particular way.

In one example, the determination portion 144 may estimate the arrival direction of speech input with a volume whose magnitude exceeds a threshold by the speech input portion 120 as the user-uttered speech source direction Du. Furthermore, there may be a plurality of arrival directions of speech input with a volume having magnitude exceeding the threshold. In this case, the speech recognition portion 144 may estimate, as the user-uttered speech source direction Du, the arrival direction of speech input with the volume having magnitude exceeding the threshold initially among a plurality of arrival directions. In addition, the speech recognition portion 144 may estimate, as the user-uttered speech source direction Du, one arrival direction that matches, or is similar to, the direction of the finger of the user (e.g., the direction from the tip to the base of the finger) who performs the operation of selecting a speech-based speech recognition start object (not shown) among a plurality of arrival directions. The range of similarity may be determined in advance. In addition, the finger direction may be obtained by analyzing the input image.

Furthermore, in one example, the determination portion 144 may estimate, as the user-uttered speech source direction Du, the arrival direction of speech input with the maximum volume by the speech input portion 120. Alternatively, the determination portion 144 may estimate, as the user-uttered speech source direction Du, one arrival direction that matches, or is similar to, the direction of the finger of the user who performs the operation of selecting the speech recognition start object (not shown). In this event, the determination portion 144 may determine, as noise, the speech input to the speech input portion 120 from a direction other than the user-uttered speech source direction, and may determine, as a noise volume, the volume input to the speech input portion 120 from a direction other than the user-uttered speech source direction Du.

Then, in the case where the user-uttered speech volume exceeds the volume at which speech recognition can be performed by the speech recognition portion 145 (hereinafter also referred to as "recognizable volume"), the display controller 146 may cause the display portion 130 to display a first motion object Mu that moves toward the display object Sb. This makes it possible for the user to find whether the speech is uttered with the volume at which speech recognition can be performed. In addition, the display controller 146 may cause the display portion 130 to display the first motion object Mu on the basis of the user-uttered speech source direction Du. This makes it possible for the user to find reliably whether the user's own speech volume exceeds the speech recognizable volume.

Specifically, the display controller 146 may move the first motion object Mu toward the display object Sb in a direction opposite to the user-uttered speech source direction Du. Although the example illustrated in FIG. 3 assumes the case in which circular objects appearing one after another near the user move in the direction opposite to the user-uttered speech source direction Du and they disappear upon arrival at the display object Sb, the movement of the first motion object Mu is not limited to this example. In one example, the display controller 146 may control a parameter relating to the first motion object Mu on the basis of predetermined information corresponding to the input speech. The input speech used in this case may be input speech from the user-uttered speech source direction. In one example, the parameter relating to the first motion object may include at least one of the size, shape, color, and movement speed of the first motion object Mu.

The predetermined information corresponding to the input speech may include at least one of the user-uttered speech volume, a frequency of the input speech, a recognition string acquisition speed, feature quantity extracted from the input speech, and a user identified from the input speech. In one example, as the recognition string acquisition speed increases, the display controller 146 may increase the movement speed of the first motion object Mu. In the case where the acquisition speed of the recognition string exceeds a predetermined speed, the display controller 146 may cause the user to find the situation in which the speech recognition is difficult to be performed by providing a predetermined movement (e.g., a movement to be repelled by the display object Sb) to the first motion object Mu.

Moreover, the speech recognition portion 145 preferably acquires a recognition string by performing speech recognition on the input speech from the user-uttered speech source direction. This makes it possible to perform speech recognition on speech with noise less than the noise occurs in the case where speech recognition is performed directly on the speech input by the speech input portion 120, thus it is expected to improve the accuracy of speech recognition. In addition, the display controller 146 preferably causes the display portion 130 to display the recognition string. This makes it possible for the user to find the recognition string obtained by speech recognition.

Figure 4:
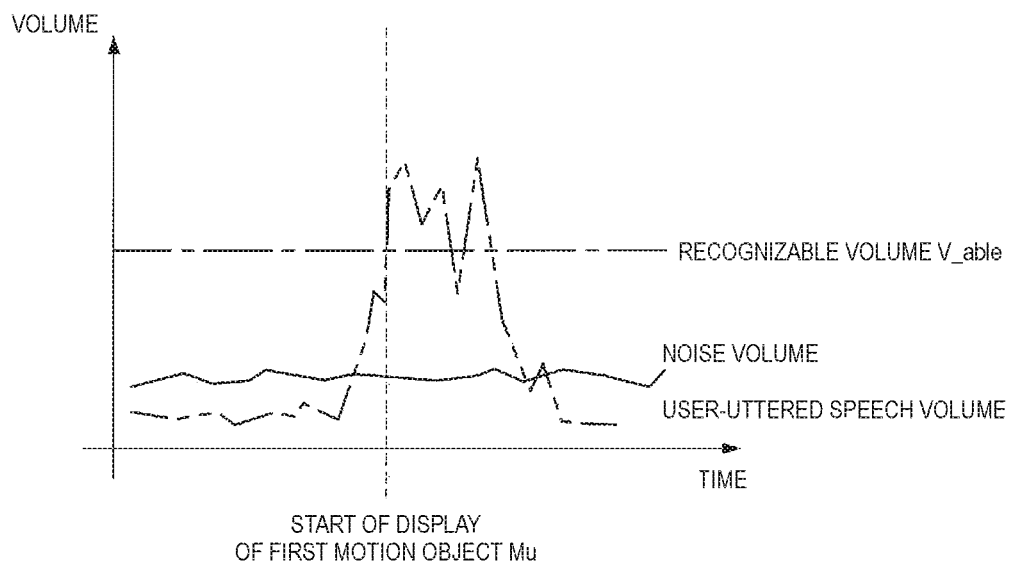
FIG. 4 is a diagram illustrated to describe the start of display of a first motion object.

The start of display of the first motion object Mu is further described. FIG. 4 is a diagram illustrated to describe the start of display of the first motion object Mu. As illustrated in FIG. 4, a case where the noise volume and the user-uttered speech volume change with time is assumed. As illustrated in FIG. 4, the display controller 146 may start to cause the display portion 130 to display the first motion object Mu at the time when the user-uttered speech volume exceeds a recognizable volume V_able (or at the time when the user-uttered speech volume is equal to the recognizable volume V_able).

[1.4. Setting of Recognizable Volume]

Figure 5:
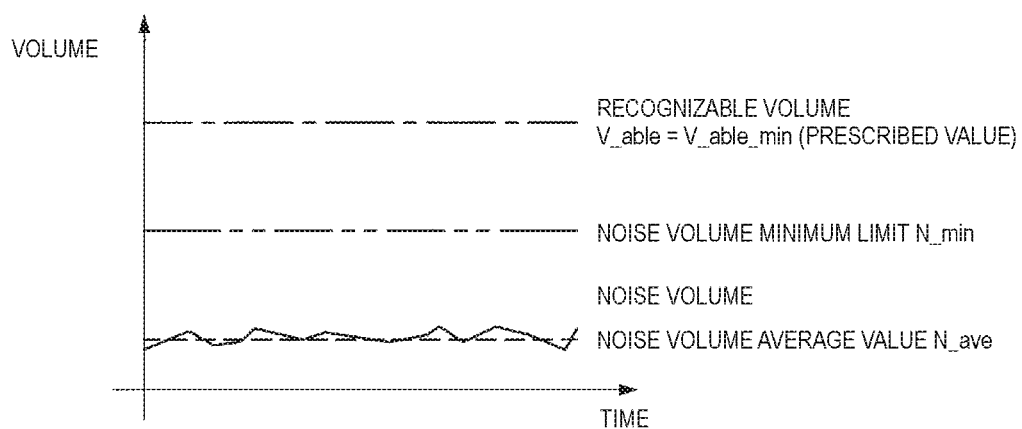
FIG. 5 is a diagram illustrated to describe a recognizable volume.
Figure 6:
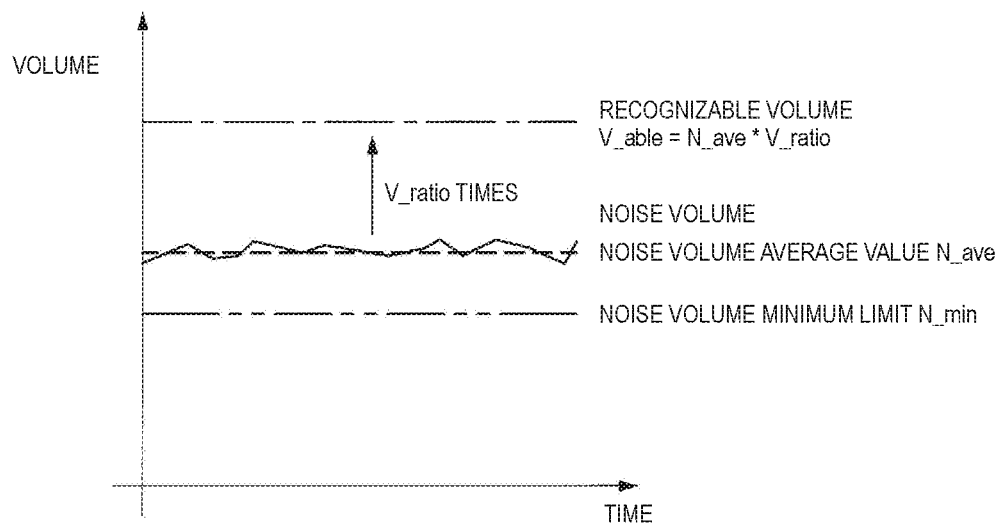
FIG. 6 is a diagram illustrated to describe a recognizable volume.
Figure 7:
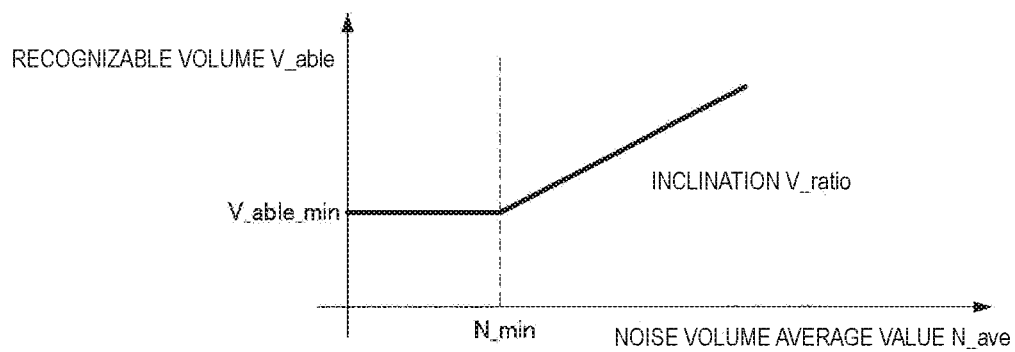
FIG. 7 is a diagram illustrated to describe a recognizable volume.

Subsequently, the recognizable volume is described in detail. It is conceivable that the recognizable volume described above is not typically constant but changes with the noise volume. FIGS. 5 to 7 are diagrams illustrated to describe the recognizable volume. In one example, as illustrated in FIG. 5, in the case where a noise volume average value N_ave is below a predetermined minimum limit (hereinafter also referred to as "noise volume minimum limit") N_min, it is considered that the recognizable volume V_able remains unchanged. Thus, in the case where the noise volume average value N_ave is below the noise volume minimum limit N_min, the determination portion 144 may set the recognizable volume V_able to a prescribed value V_able_min. Moreover, the noise volume itself may be used instead of the noise volume average value N_ave.

On the other hand, in one example, as illustrated in FIG. 6, in the case where the noise volume average value N_ave exceeds the noise volume minimum limit N_min, the recognizable volume V_able may change depending on the noise volume average value N_ave. Thus, in the case where the noise volume average value N_ave exceeds the noise volume minimum limit N_min, the determination portion 144 may set the recognizable volume V_able to a volume corresponding to the noise volume average value N_ave (in the example illustrated in FIG. 6, a value obtained by multiplying the noise volume average value N_ave by V_ratio). Moreover, the noise volume itself may be used instead of the noise volume average value N_ave.

The relationship between the noise volume average value N_ave and the recognizable volume V_able on the basis of the examples shown in FIGS. 5 and 6 is illustrated in FIG. 7. Referring to FIG. 7, in the case where the noise volume average value N_ave is below the noise volume minimum limit N_min, the recognizable volume V_able is set to the prescribed value V_able_min. However, in the case where the noise volume average value N_ave exceeds the noise volume minimum limit N_min, it is found that the recognizable volume V_able is set to the value obtained by multiplying the noise volume average value N_ave by V_ratio. However, the recognizable volume V_able in the case where the noise volume average value N_ave exceeds the noise volume minimum limit N_min is not necessary to be changed linearly.

Moreover, in the case where the noise volume average value N_ave is equal to the noise volume minimum limit N_min, the recognizable volume V_able may be set to the prescribed value V_able_min, or the recognizable volume V_able may be set to the volume corresponding to the noise volume average value N_ave. In addition, values including the prescribed value V_able_min, the noise volume minimum limit N_min, and the V_ratio may be set in advance depending on the use environment of a product for speech recognition, the use case, and the like, or may be dynamically updated by software update or the like performed at the start of speech recognition.

[1.5. Display of Second Motion Object]

Displaying the first motion object Mu as described above makes it possible for the user to find that the speech is uttered with the speech recognizable volume. On the other hand, even if the speech is uttered with the speech recognizable volume, speech recognition is likely to be disturbed by noise. Thus, it is effective to cause the user to find whether noise is present. FIG. 8 is a diagram illustrating another example of the screen displayed by the display portion 130. Referring to FIG. 8, noise sources Ns1 and Ns2 are present. In this regard, the case where there are two noise sources is described below, but the number of noise sources is not limited.

Moreover, FIG. 8 illustrates two persons different from the user U as examples of the noise sources Ns1 and Ns2, but the type of the noise source may be a living thing other than a person, or may be anything other than the living thing (e.g., an artificial object). In this situation, the determination portion 144 determines a noise volume on the basis of the input speech. In this regard, the way of determining the noise volume is not limited to a particular way. In one example, the determination portion 144 may estimate noise source directions Dn1 and Dn2, and may determine the volume input from the noise source directions Dn1 and Dn2 as the noise volume. Moreover, the way of estimating the noise source directions Dn1 and Dn2 is also not limited to a particular way.

In one example, there may be a case where there are a plurality of arrival directions of speech input with a volume having magnitude exceeding a threshold. In this case, the determination portion 144 may estimate, as the noise source directions Dn1 and Dn2, an arrival direction of the speech input with the volume having the second and subsequent magnitude exceeding the threshold among the plurality of arrival directions. Alternatively, in one example, the determination portion 144 may estimate, as the noise source directions Dn1 and Dn2, an arrival direction of the speech input with the volume having the second and subsequent magnitude by the speech input portion 120.

Then, in the case where the noise volume exceeds the speech recognizable volume, the display controller 146 may cause the display portion 130 to display second motion objects Mn1 and Mn2 that are different from the first motion object Mu. This makes it possible for the user U to find whether noise emitting the volume exceeding the recognizable volume is present. In addition, the display controller 146 may cause the display portion 130 to display the second motion objects Mn1 and Mn2 on the basis of the noise source direction. This makes it possible for the user to find the direction of the noise source emitting the volume exceeding the recognizable volume.

In addition, the display controller 146 may move the second motion objects Mn1 and Mn2 so that the movement to the display object Sb is blocked. In one example, as illustrated in FIG. 8, the display controller 146 may move the second motion objects Mn1 and Mn2 not to be outside the predetermined range. This makes it possible for the user to find more intuitively that speech recognition on the speech emitting from the noise source directions Dn1 and Dn2 is not performed in the case of performing speech recognition on the input speech from the user-uttered speech source direction.

FIG. 9 is a diagram illustrated to describe the start of display of the second motion objects Mn1 and Mn2. As illustrated in FIG. 9, a case where a first noise volume of noise emitting from the noise source Ns1, a second noise volume of noise emitting from the noise source Ns2, and a speech volume uttered by the user U change with time is assumed. In this case, at the time when the first noise volume exceeds the recognizable volume V_able (alternatively, at the time when the first noise volume is equal to the recognizable volume V_able), the display controller 146 may cause the display portion 130 to display the second motion object Mn1. In addition, at the time when the second noise volume exceeds the recognizable volume V_able (alternatively, at the time when the second noise volume is equal to the recognizable volume V_able), the display controller 146 may cause the display portion 130 to display the second motion object Mn2. The start of display of the first motion object Mu is as described above.

[1.6. Operation Example]

Figure 10A:
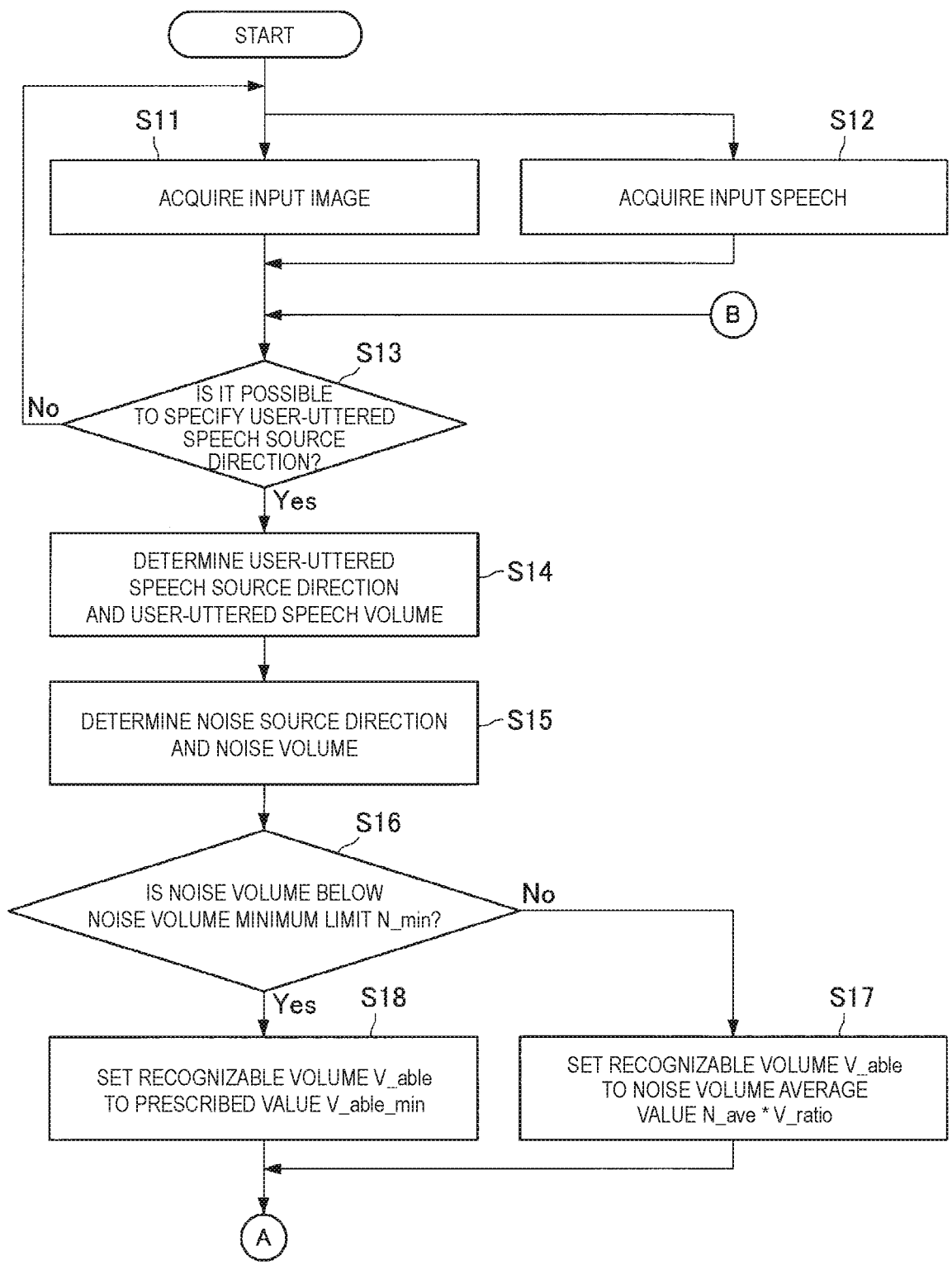
FIG. 10A is a flowchart showing an example of an operation procedure of an information processing system.
Figure 10B:
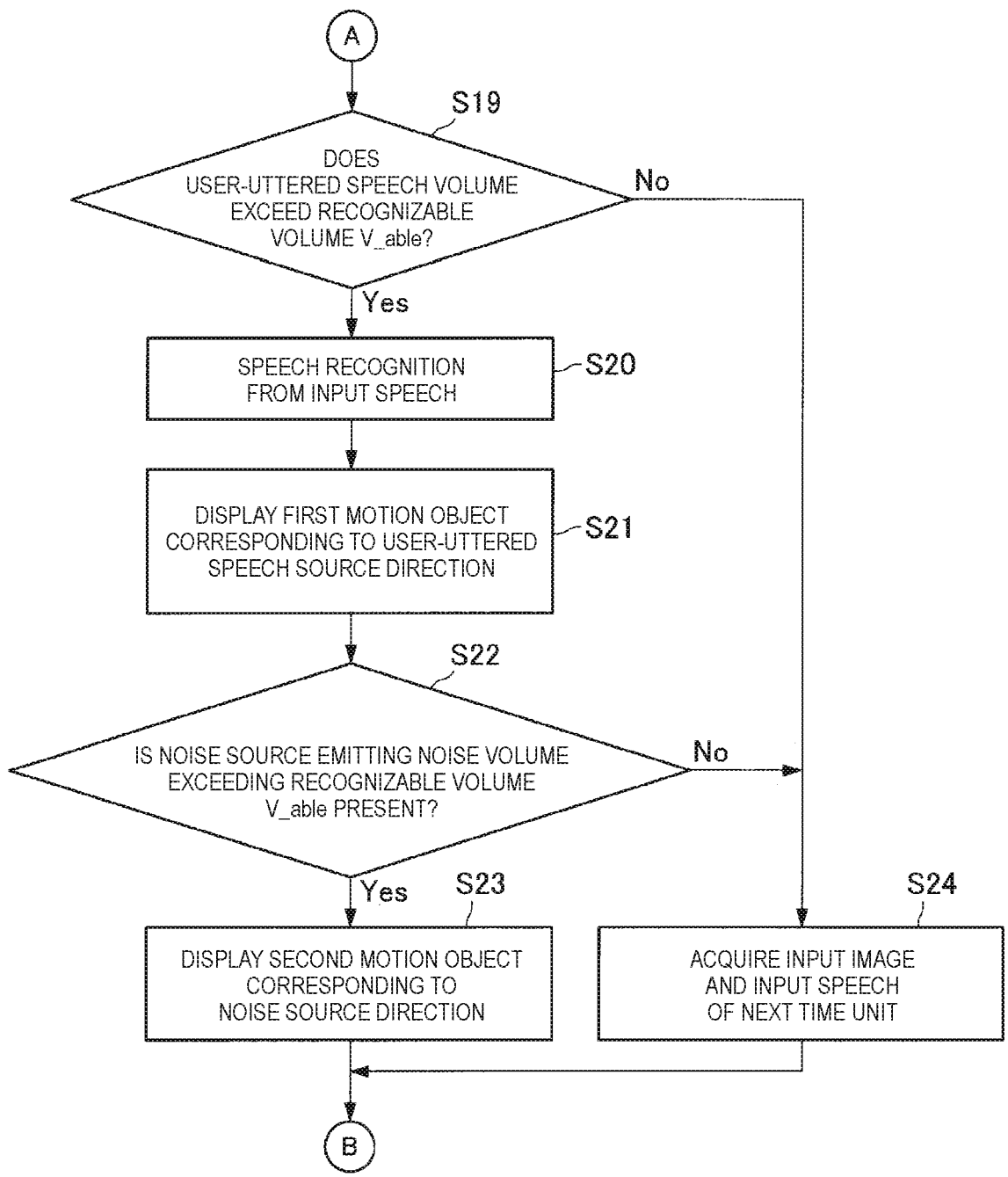
FIG. 10B is a flowchart showing an example of an operation procedure of an information processing system.

Subsequently, an operation procedure of the information processing system 10 according to an embodiment of the present disclosure is described. FIGS. 10A and 10B are flowcharts showing an example of an operation procedure of the information processing system 10 according to an embodiment of the present disclosure. Moreover, the flowcharts of FIGS. 10A and 10B are merely examples of the operation procedure of the information processing system 10 according to the embodiment of the present disclosure. Thus, the operation procedure of the information processing system 10 according to an embodiment of the present disclosure is not limited to the examples shown in the flowcharts of FIGS. 10A and 10B.

The input image acquisition portion 141 acquires an input image that is input by the image input portion 110 (S11). In addition, the input speech acquisition portion 142 acquires input speech that is input by the speech input portion 120 (S12). Subsequently, if the user-uttered speech source direction fails to be specified on the basis of the input image and the input speech ("No" in S13), the information processing device 140 shifts the operation to S11 and S12. On the other hand, if the user-uttered speech source direction can be specified on the basis of the input image and the input speech ("Yes" in S13), the information processing device 140 shifts the operation to S14.

Subsequently, the determination portion 144 determines the user-uttered speech source direction and the user-uttered speech volume (S14), and determines the noise source direction and the noise volume (S15). Subsequently, if the noise volume exceeds the noise volume minimum limit N_min ("No" in S16), the determination portion 144 sets the recognizable volume V_able to a value obtained by multiplying the noise volume average value N_ave by V_ratio (S17) and shifts the operation to S19. On the other hand, if the noise volume is below the noise volume minimum limit N_min ("Yes" in S16), the determination portion 144 sets the recognizable volume V_able to the prescribed value V_able_min (S18) and shifts the operation to S19.

Subsequently, if the user-uttered speech volume exceeds the recognizable volume V_able ("No" in S19), the information processing device 140 shifts the operation to S24. On the other hand, if the user-uttered speech volume exceeds the recognizable volume V_able ("Yes" in S19), the speech recognition portion 145 performs speech recognition from the input speech. In this case, the speech recognition portion 145 preferably performs speech recognition on the input speech from the user-uttered speech source direction.

Subsequently, the display controller 146 causes the display portion 130 to display the first motion object Mu corresponding to the user-uttered speech source direction (S21). Then, if a noise source emitting a noise volume exceeding the recognizable volume V_able is present ("Yes" in S22), the display controller 146 causes the display portion 130 to display the second motion object corresponding to the noise source direction (S23) and shifts the operation to S13. On the other hand, if a noise source emitting a noise volume exceeding the recognizable volume V_able is not present ("No" in S22), the information processing device 140 shifts the operation to S24. If the operation is shifted to S24, the information processing device 140 causes the input image acquisition portion 141 and the input sound acquisition portion 142 to acquire an input image and input speech, respectively, of the next time unit (S24), and shifts the operation to S13.

[1.7. Modified Example of Display Form]

Figure 11:
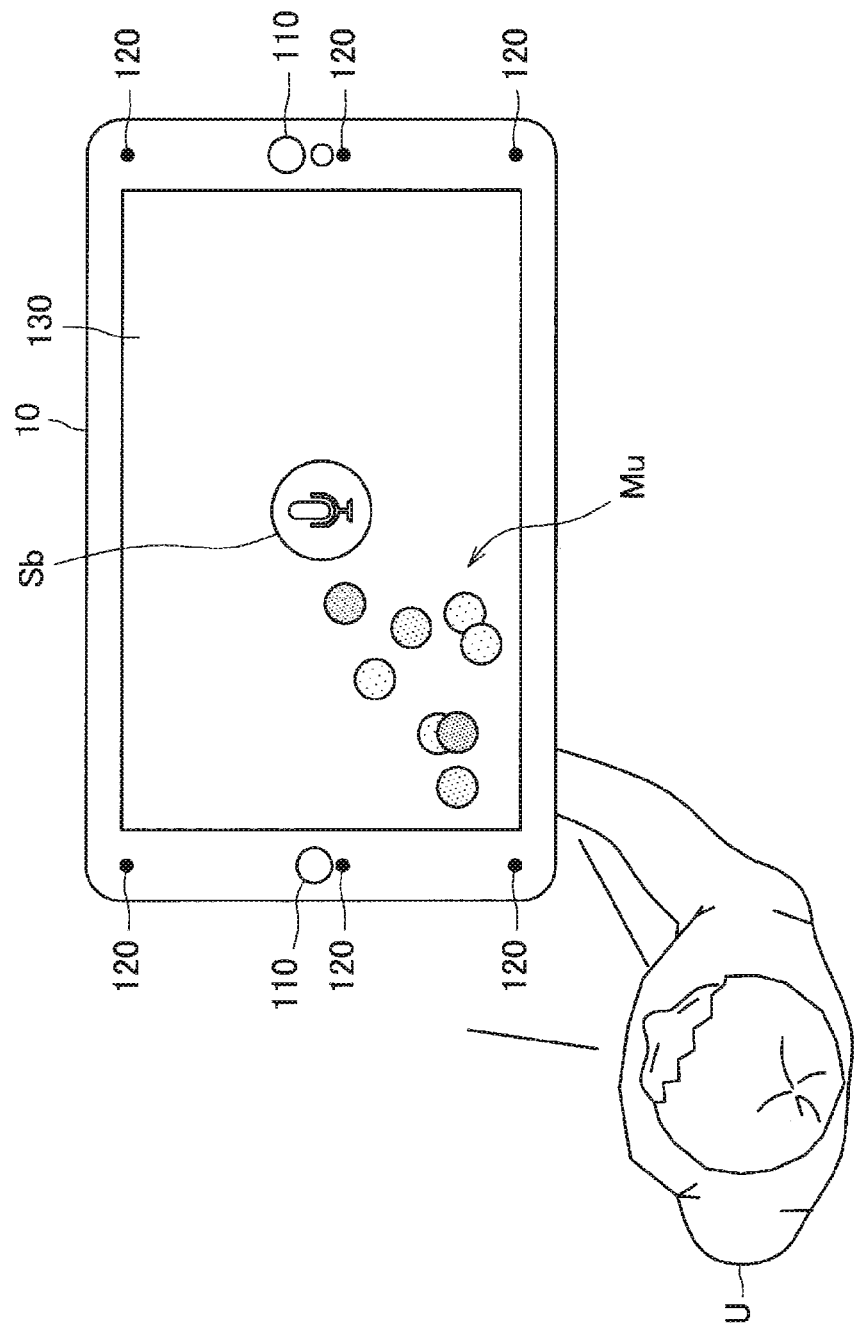
FIG. 11 is a diagram illustrating a modified example 1 of a display form of a display portion.

The above description is given as to the example in which the display portion 130 is a projector capable of projecting a screen onto the top surface of the table Tbl. However, the display form of the display portion 130 is not limited to this example. A modified example of the display form of the display portion 130 is described. FIG. 11 is a diagram illustrating a modified example 1 of the display form of the display portion 130. As illustrated in FIG. 11, in the case where the information processing system 10 is a mobile terminal, the display portion 130 may be provided in the mobile terminal. The type of the mobile terminal is not limited to a particular type, and it may be a tablet terminal, a smartphone, or a cellular phone.

Figure 12:
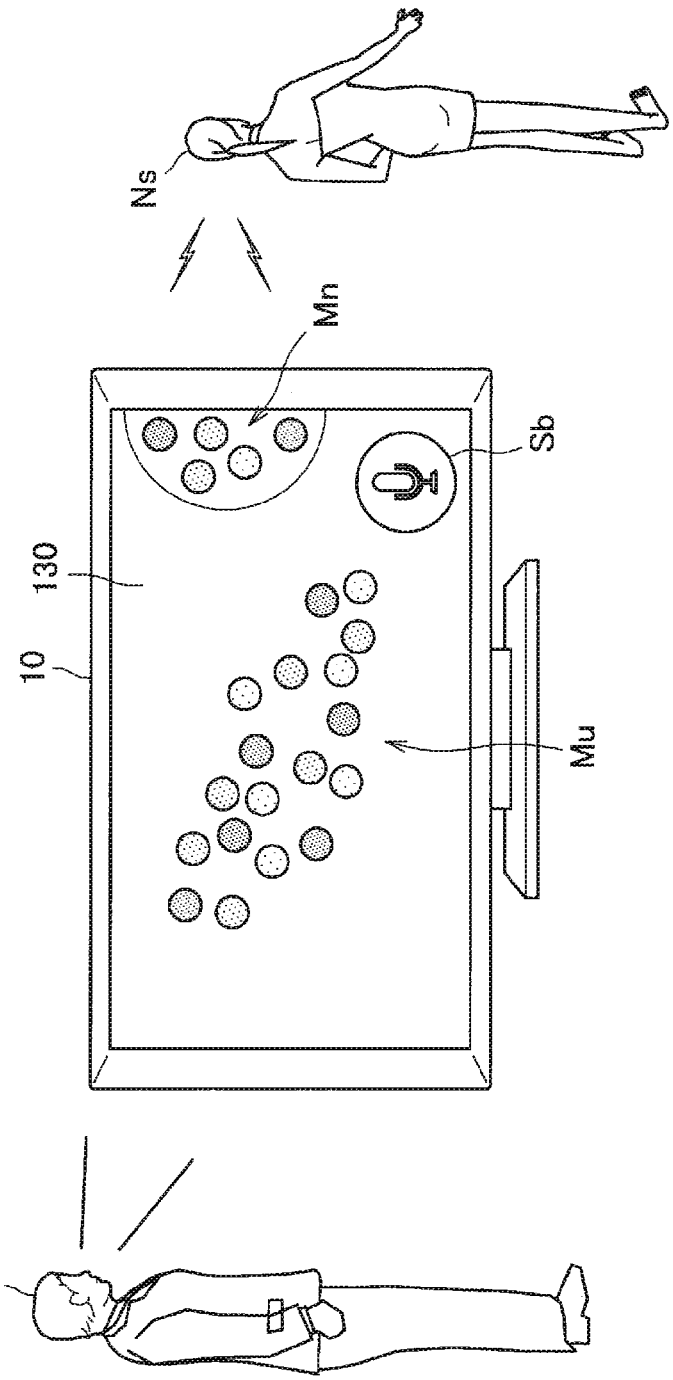
FIG. 12 is a diagram illustrating a modified example 2 of a display form of a display portion.

Furthermore, FIG. 12 is a diagram illustrating a modified example 2 of the display form of the display portion 130. As illustrated in FIG. 12, in the case where the information processing system 10 includes a television receiver, the display portion 130 may be provided in the television receiver. In this case, as illustrated in FIG. 12, the display controller 146 causes the display portion 130 to display the first motion object Mu on the basis of the sound source direction of the speech uttered by the user U and to display the second motion object Mn on the basis of the direction of the noise sound source Ns.

Figure 13:
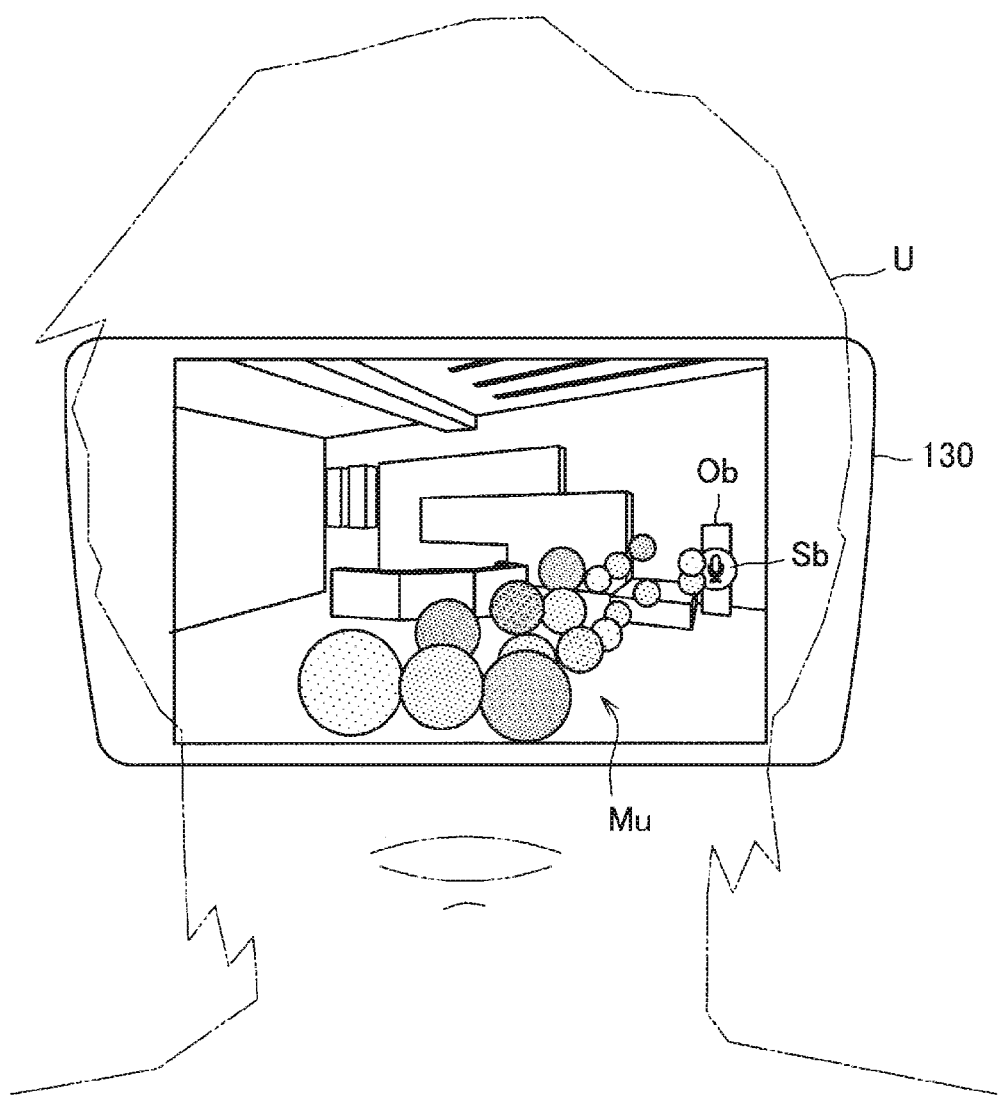
FIG. 13 is a diagram illustrating a modified example 3 of a display form of a display portion.

FIG. 13 is a diagram illustrating a modified example 3 of the display form of the display portion 130. As illustrated in FIG. 13, the display portion 130 may be a head-mounted display. In such a case, as illustrated in FIG. 13, in the case where an object Ob in association with a display object Sb is recognized from an image captured by a camera provided in the head-mounted display, the display controller 146 may cause the display portion 130 to display the display object Sb. In one example, the display controller 146 may recognize a three-dimensional position and posture of the object Ob and may arrange the display object Sb in the augmented reality (AR) space in accordance with the recognized three-dimensional position and posture.

The first motion object Mu may also be moved on the basis of the three-dimensional position of the object Ob. In one example, in the case where the user-uttered speech volume exceeds the speech recognizable volume, the display controller 146 may cause the first motion object Mu to be displayed by moving the first motion object Mu in the AR space toward the three-dimensional position of the object Ob so that the first motion object Mu moves from the near side to the far side. In the example illustrated in FIG. 13, the mouth of the user U is estimated as the user-uttered speech source direction, and thus the first motion object Mu appears from the vicinity of the user's mouth and moves to the display object Sb.

Furthermore, the example illustrated in FIG. 13 assumes a case where the object Ob is a lighting fixture and speech recognition is performed in a state in which the display object Sb is displayed. In this case, the information processing device 140 causes the object Ob to execute an operation corresponding to the recognition string obtained by speech recognition (e.g., switching between power ON and OFF in the lighting fixture). However, the object Ob may be any object other than lighting fixtures.

Figure 14:
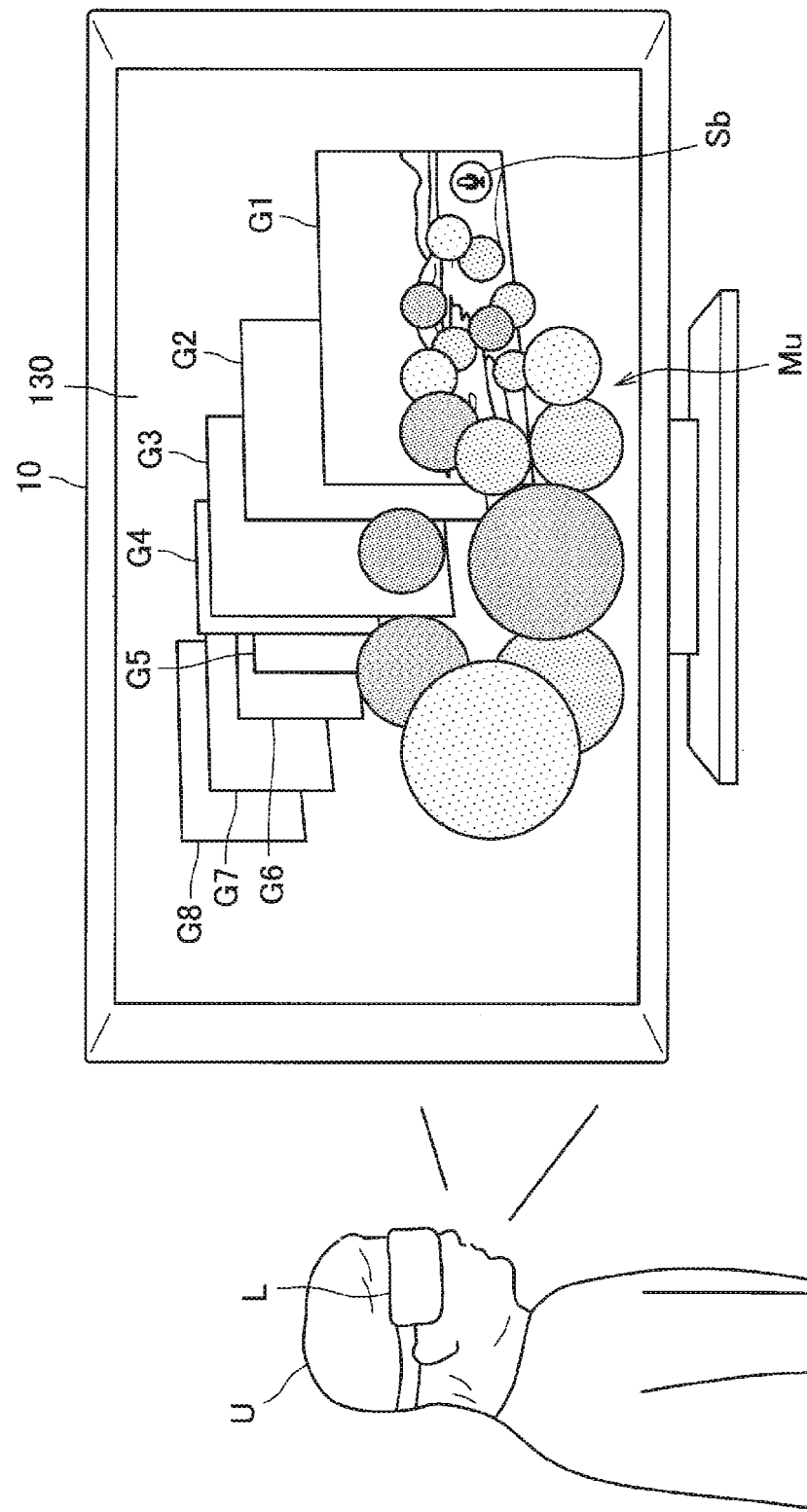
FIG. 14 is a diagram illustrating a modified example 4 of a display form of a display portion.

FIG. 14 is a diagram illustrating a modified example 4 of the display form of the display portion 130. As illustrated in FIG. 14, in the case where the information processing system 10 includes a three-dimensional stereoscopic display, the display portion 130 may be provided in the three-dimensional stereoscopic display. In such a case, as illustrated in FIG. 14, if the user-uttered speech volume exceeds the speech recognizable volume, the display controller 146 may cause the first motion object Mu to be displayed so that the first motion object Mu moves toward the display object Sb with representation of a movement from the near side to the far side. The representation of a movement from the near side to the far side may be implemented by using the parallax of the left and right eyes of the user U.

In the example illustrated in FIG. 14, the representation of a movement from the near side to the far side is implemented by allowing the user U to wear a stereoscopic eyeglasses L. However, the representation of a movement from the near side to the far side may be implemented by the naked-eye stereoscopic view in which the user U does not wear the stereoscopic eyeglasses L. In one example, even when the display portion 130 displays a plurality of objects (e.g., application windows) G1 to G8 as illustrated in FIG. 14, the matching of the depth of the display object Sb displayed on the object G1 with the depth of a destination of the first motion object Mu makes easier for the user U to find that speech recognition is used for the object G1.

Figure 15:
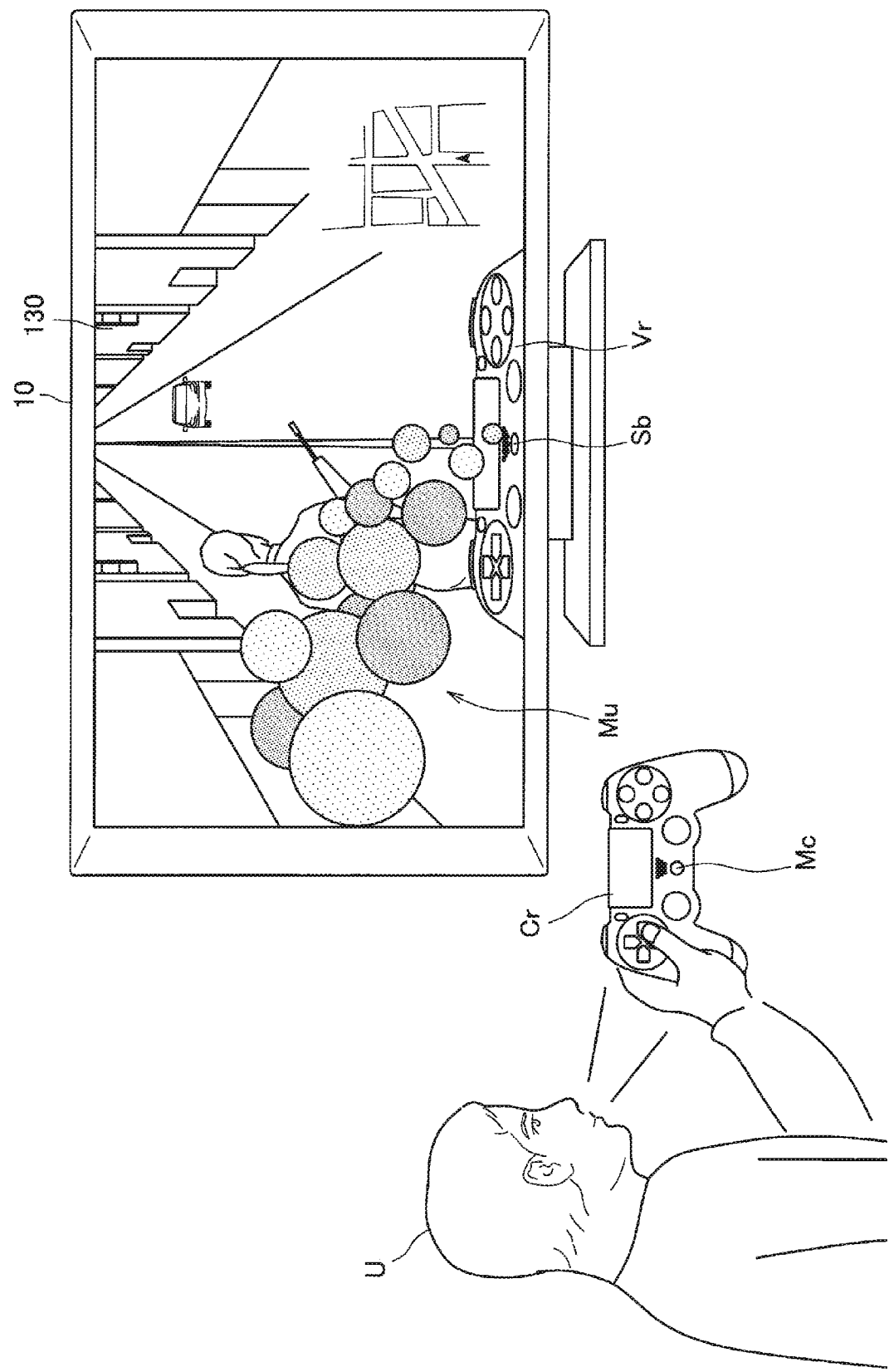
FIG. 15 is a diagram illustrating a modified example 5 of a display form of a display portion.

FIG. 15 is a diagram illustrating a modified example 5 of the display form of the display portion 130. As illustrated in FIG. 15, the display controller 146 may cause the display portion 130 to display a virtual object Vr and cause the display portion 130 to display a predetermined object included in the virtual object Vr as the display object Sb. In the example illustrated in FIG. 15, the virtual object Vr associates with a game controller Cr, but the virtual object Vr may associate with an object other than the game controller Cr. In addition, in the example illustrated in FIG. 15, the predetermined object associates with a microphone Mc included in the game controller Cr, but the predetermined object is not limited to the microphone Mc.

If the virtual object Vr and the display object Sb are displayed as described above, the user U views a destination of the first motion object Mu displayed on the display portion 130, so the user U can easily find a position at which the user's own speech is input. In addition, if the virtual object Vr and the display object Sb are displayed as described above, it is possible to prevent the user U from acting such as speaking to a wrong position (e.g., to the display portion 130).

[1.8. Hardware Configuration Example]

Figure 16:
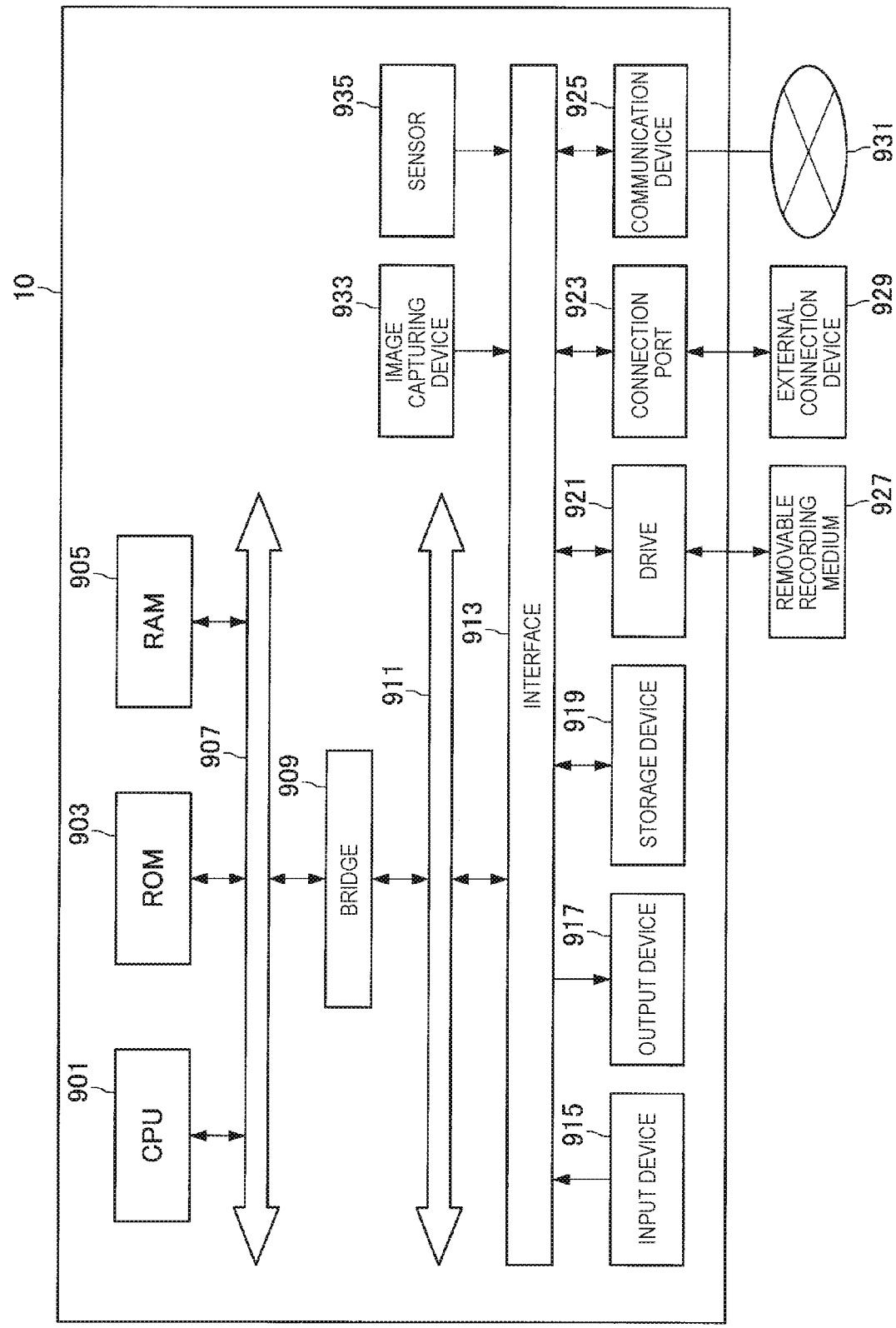
FIG. 16 is a block diagram illustrating a hardware configuration example of an information processing system.

Next, the hardware configuration of the information processing system 10 according to an embodiment of the present disclosure is described with reference to FIG. 16. FIG. 16 is a block diagram illustrating a hardware configuration example of the information processing system 10 according to an embodiment of the present disclosure.

As illustrated in FIG. 16, the information processing system 10 includes a central processing unit (CPU) 901, a read only memory (ROM) 903, and a random access memory (RAM) 905. In addition, the information processing system 10 may include a host bus 907, a bridge 909, an external bus 911, an interface 913, an input device 915, an output device 917, a storage device 919, a drive 921, a connection port 923, and a communication device 925. The information processing system 10 may further include an image capturing device 933 and a sensor 935 as necessary. In conjunction with, or in place of, the CPU 901, the information processing system 10 may have a processing circuit called a digital signal processor (DSP) or application specific integrated circuit (ASIC).

The CPU 901 functions as an arithmetic processing unit and a control device, and controls the overall operation in the information processing system 10 or a part thereof in accordance with various programs recorded in the ROM 903, the RAM 905, the storage device 919, or the removable recording medium 927. The ROM 903 stores, for example, programs and operation parameters used by the CPU 901. The RAM 905 temporarily stores, for example, programs to be used in the execution by the CPU 901 and parameters that change as appropriate in executing the programs. The CPU 901, the ROM 903, and the RAM 905 are connected with each other via a host bus 907 that is composed of an internal bus such as a CPU bus. Furthermore, the host bus 907 is connected to an external bus 911 such as peripheral component interconnect (PCI)/interface bus via a bridge 909.

The input device 915 is, for example, a device operated by a user, such as a mouse, a keyboard, a touch panel, a button, a switch, and a lever. The input device 915 may include a microphone for detecting user's voice. The input device 915 may be, for example, a remote control device using infrared rays or other radio waves, or may be an external connection device 929 such as a cellular phone conforming to the operation of the information processing system 10. The input device 915 includes an input control circuit that generates an input signal on the basis of the information input by the user and outputs it to the CPU 901. The user inputs various data to the information processing system 10 and instructs the information processing system 10 to perform a processing operation by operating the input device 915. In addition, the image capturing device 933, which will be described later, can also function as an input device by capturing the movement of the user's hand or finger, and the like. In this case, the pointing position may be determined depending on the motion of the hand or the orientation of the finger.

The output device 917 is composed of a device capable of notifying visually or audibly the user of the acquired information. The output device 917 may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 917 outputs the result obtained by the processing of the information processing system 10 as a video such as a text or an image, or outputs it as audio such as a voice or sound. In addition, the output device 917 may include, for example, a light for lighting up the surroundings.

The storage device 919 is a data storage device configured as an example of a storage portion of the information processing system 10. The storage device 919 is composed of, for example, a magnetic storage device such as hard disk drives (HDDs), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the information processing system 10 or externally attached thereto. The drive 921 reads the information recorded in the attached removable recording medium 927 and outputs it to the RAM 905. In addition, the drive 921 writes in the attached removable recording medium 927.

The connection port 923 is a port for directly connecting the device to the information processing system 10. The connection port 923 may be, for example, a universal serial bus (USB) port, an IEEE 1394 port, or a small computer system interface (SCSI) port. In addition, the connection port 923 may be, for example, an RS-232C port, an optical audio terminal, or high-definition multimedia interface (HDMI, registered trademark) port. The external connection device 929 is connected to the connection port 923, and thus various kinds of data can be exchanged between the information processing system 10 and the external connection device 929.

The communication device 925 is, for example, a communication interface composed of a communication device or the like, which is used to be connected to the communication network 931. The communication device 925 may be, for example, a communication card for wired or wireless local area network (LAN), Bluetooth (registered trademark), or wireless USB (WUSB). In addition, the communication device 925 may be, for example, a router for optical communication, a router for asymmetric digital subscriber line (ADSL), or a modem for various communications. The communication device 925 transmits and receives signals or the like using a predetermined protocol such as TCP/IP, for example, with the Internet or other communication devices. In addition, the communication network 931 connected to the communication device 925 is a network connected by wire or wireless, and is, for example, the Internet, home LAN, infrared communication, radio wave communication, satellite communication, or the like.

The image capturing device 933 captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 933 may capture a still image or a moving image.

The sensor 935 is, for example, various sensors such as an accelerometer, a gyro sensor, a geomagnetic sensor, a photosensor, and a sound sensor. The sensor 935 acquires information on the state of the information processing system 10 itself, such as the attitude of the casing of the information processing system 10, and information on the surrounding environment of the information processing system 10 such as brightness or noise around the information processing system 10. The sensor 935 may also include a GPS sensor, which receives global positioning system (GPS) signals and measures the latitude, longitude, and altitude of the device.

The above description is given as to the example of the hardware configuration of the information processing system 10. Each of the components described above may be configured using a general-purpose member, or may be configured with hardware dedicated to the function of each component. Such a configuration can be changed appropriately depending on the technical level at the time of implementation.

2. CONCLUSION

According to an embodiment of the present disclosure as described above, there is provided the information processing device 140 including the determination portion 144 and the display controller 146. The determination portion 144 determines a user-uttered speech volume on the basis of input speech, and the display controller 146 controls the display portion 130 so that the display portion 130 displays a display object Sb. The display controller 146 causes the display portion 130 to display a first motion object moving toward the display object Sb when the user-uttered speech volume exceeds a speech recognizable volume.

According to such a configuration, it is possible for the user to find whether the speech is uttered with the volume at which speech recognition can be performed. In one example, in the case where speech recognition is performed incorrectly, the user can find how to change the speech. In addition, when the user's speech is changed on the basis of the obtained result, it is expected that the success rate of speech recognition will be improved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The above description is given as to the modified example of the display form of the display portion 130, but the display form of the display portion 130 is not limited to the above example. The display portion 130 may be, for example, a display provided in a wearable terminal (e.g., a watch or glasses) other than the head mounted display. In addition, the display portion 130 may be, for example, a display provided in an in-vehicle navigation system. In addition, the display portion 130 may be, for example, a display used in the healthcare field.

Furthermore, it is possible to create a program for causing the hardware such as CPU, ROM and RAM incorporated in the computer to execute functions equivalent to those of the information processing system 10 as described above. In addition, a computer-readable recording medium on which the program is recorded can also be provided.

Furthermore, the display controller 146 generates display control information for displaying the display content on the display portion 130 and outputs the generated display control information to the display portion 130, and thus can control the display portion 130 so that the display portion 130 displays the display content. The contents of the display control information may be changed appropriately in accordance with the system configuration.

Specifically, the program used to implement the information processing device 140 may be, for example, a web application. In such a case, the display control information may be created using markup languages such as hypertext markup language (HTML), standard generalized markup language (SGML), and extensible markup language (XML).

The position of each component is not limited to a particular position as long as the operation of the information processing system 10 described above is performed. In one specific example, the image input portion 110, the operation input portion 115, the speech input portion 120, the display portion 130, and the information processing device 140 may be provided in different devices connected via a network. In this case, the information processing device 140 corresponds to, for example, a server such as a web server or a cloud server, and the image input portion 110, the operation input portion 115, the speech input portion 120, and the display portion 130 may correspond to a client connected to the server via a network.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a determination portion configured to determine a user-uttered speech volume on the basis of input speech; and a display controller configured to control a display portion so that the display portion displays a display object, wherein the display controller causes the display portion to display a first motion object moving toward the display object when the user-uttered speech volume exceeds a speech recognizable volume.

(2)

The information processing device according to (1), wherein the determination portion determines a user-uttered speech source direction, and the display controller causes the display portion to display the first motion object on the basis of the user-uttered speech source direction.

(3)

The information processing device according to (2), further including:

a speech recognition portion configured to acquire a recognition string by performing speech recognition on input speech from the user-uttered speech source direction.

(4)

The information processing device according to (3), wherein the display controller causes the display portion to display the recognition string.

(5)

The information processing device according to any one of (1) to (4), wherein the determination portion determines a noise volume on the basis of the input speech, and the display controller causes the display portion to display a second motion object different from the first motion object when the noise volume exceeds the speech recognizable volume.

(6)

The information processing device according to (5), wherein the determination portion determines a noise source direction, and the display controller causes the display portion to display the second motion object on the basis of the noise source direction.

(7)

The information processing device according to (6), wherein the second motion object is moved so that movement to the display object is blocked.

(8)

The information processing device according to any one of (1) to (7), wherein the display controller controls a parameter relating to the first motion object on the basis of predetermined information corresponding to the input speech.

(9)

The information processing device according to (8), wherein the parameter relating to the first motion object includes at least one of a size, shape, color, and movement speed of the first motion object.

(10)

The information processing device according to (8) or (9), wherein the predetermined information corresponding to the input speech includes at least one of the user-uttered speech volume, a frequency of the input speech, a recognition string acquisition speed, feature quantity extracted from the input speech, and a user identified from the input speech.

(11)

The information processing device according to (2), wherein the determination portion determines the user-uttered speech source direction on the basis of an arrival direction of speech input with a volume having magnitude exceeding a threshold.

(12)

The information processing device according to (2), wherein the determination portion determines the user-uttered speech source direction on the basis of an arrival direction of speech input with a maximum volume.

(13)

The information processing device according to (2), wherein the determination portion determines the user-uttered speech source direction on the basis of a direction from a tip to a base of a finger.

(14)

The information processing device according to (6), wherein the determination portion sets the speech recognizable volume to a prescribed value when the noise volume is below a minimum limit.

(15)

The information processing device according to (6), wherein the determination portion sets the speech recognizable volume to a volume corresponding to an average value of the noise volume or a volume corresponding to the noise volume when the noise volume exceeds a minimum limit.

(16)

The information processing device according to any one of (1) to (15), wherein the display controller causes the display portion to display the display object when an object associated with the display object is recognized from a captured image.

(17)

The information processing device according to any one of (1) to (16), wherein the display controller causes the display portion to display the first motion object moving toward the display object with a representation of a movement from a near side to a far side when the user-uttered speech volume exceeds the speech recognizable volume.

(18)

The information processing device according to any one of (1) to (17), wherein the display controller causes the display portion to display a virtual object and to display a predetermined object included in the virtual object as the display object.

(19)

A method of information processing, the method including:

determining a user-uttered speech volume on the basis of input speech; and controlling a display portion so that the display portion displays a display object, wherein the display portion is caused to display a first motion object moving toward the display object when the user-uttered speech volume exceeds a speech recognizable volume.

(20)

A program for causing a computer to function as an information processing device including:

a determination portion configured to determine a user-uttered speech volume on the basis of input speech; and a display controller configured to control a display portion so that the display portion displays a display object,
wherein the display controller causes the display portion to display a first motion object moving toward the display object when the user-uttered speech volume exceeds a speech recognizable volume.

REFERENCE SIGNS LIST 10 information processing system
110 image input portion
115 operation input portion
120 speech input portion
130 display portion
140 information processing device (controller)
141 input image acquisition portion
142 input speech acquisition portion
143 operation detection portion
144 determination portion
145 speech recognition portion
146 display controller
Mu first motion object
Mn, Mn, Mn2 second motion object
Ns, Ns2, Ns1 noise source
Du user-uttered speech source direction
Dn, Dn1, Dn2 noise source direction
Sb display object

The invention claimed is:

1. An information processing device, comprising:
a determination portion configured to:
determine a user-uttered speech volume based on input speech; and
determine a user-uttered speech source direction; and
a display controller configured to:
control a display portion to display a display object and a first motion object that moves in a direction from a side of a speech source to a side of the displayed display object, wherein
the display object and the first motion object are displayed based on:
the user-uttered speech volume that exceeds a speech recognizable volume, and
the user-uttered speech source direction, and
the direction of the movement of the first motion object toward the display object is opposite to the user-uttered speech source direction.

2. The information processing device according to claim 1, further comprising:
a speech recognition portion configured to acquire a recognition string based on speech recognition of the input speech from the user-uttered speech source direction.

3. The information processing device according to claim 2, wherein the display controller is further configured to control the display portion to display the acquired recognition string.

4. The information processing device according to claim 1, wherein
the determination portion is further configured to determine a noise volume based on the input speech, and
the display controller is further configured to control the display portion to display a second motion object different from the first motion object based on the noise volume that exceeds the speech recognizable volume.

5. The information processing device according to claim 4, wherein
the determination portion is further configured to determine a noise source direction, and
the display controller is further configured to control the display portion to display the second motion object based on the noise source direction.

6. The information processing device according to claim 5, wherein the display controller is further configured to move the second motion object so that the movement of the second motion object to the display object is blocked.

7. The information processing device according to claim 1, wherein the display controller is further configured to control a parameter related to the first motion object based on information corresponding to the input speech.

8. The information processing device according to claim 7, wherein the parameter related to the first motion object includes at least one of a size, a shape, a color, or a movement speed of the first motion object.

9. The information processing device according to claim 7, wherein the information corresponding to the input speech includes at least one of the user-uttered speech volume, a frequency of the input speech, a recognition string acquisition speed, a feature quantity extracted from the input speech, or a user identified from the input speech.

10. The information processing device according to claim 1, wherein the determination portion is further configured to determine the user-uttered speech source direction based on an arrival direction of the input speech with a volume having a magnitude that exceeds a threshold volume.

11. The information processing device according to claim 1, wherein the determination portion is further configured to determine the user-uttered speech source direction based on an arrival direction of the input speech with a maximum volume.

12. The information processing device according to claim 1, wherein the determination portion is further configured to:
determine a noise volume based on the input speech; and
set the speech recognizable volume to one of a volume corresponding to an average value of the noise volume or a volume corresponding to the noise volume,
wherein the speech recognizable volume is set based on the noise volume that exceeds a minimum limit.

13. The information processing device according to claim 1, wherein the display controller is further configured to control the display portion to display the display object based on recognition of an object associated with the display object from a captured image.

14. The information processing device according to claim 1, wherein the display controller is further configured to control the display portion to display the first motion object that moves toward the display object with a representation of a movement from a user near side to a user far side based on the user-uttered speech volume that exceeds the speech recognizable volume.

15. The information processing device according to claim 1, wherein the display controller is further configured to control the display portion to:
display a virtual object; and
display an object included in the virtual object as the display object.

16. A method, comprising:
determining a user-uttered speech volume based on input speech;

determining a user-uttered speech source direction; and controlling a display portion to display a display object and a first motion object moving in a direction from a side of a speech source to a side of toward the displayed display object, wherein the display object and the first motion object are displayed based on:

the user-uttered speech volume exceeding a speech recognizable volume, and the user-uttered speech source direction, and the direction of the movement of the first motion object toward the display object is opposite to the user-uttered speech source direction.

17. A non-transitory computer-readable medium having stored thereon computer-executable instructions that, when executed by a computer, cause the computer to execute operations, the operations comprising:

determining a user-uttered speech volume based on input speech;

determining a user-uttered speech source direction; and controlling a display portion to display a display object and a first motion object moving in a direction from a side of a speech source to a side of the displayed display object, wherein the display object and the first motion object are displayed based on:

the user-uttered speech volume exceeding a speech recognizable volume, and the user-uttered speech source direction, and the direction of the movement of the first motion object toward the display object is opposite to the user-uttered speech source direction.

18. An information processing device, comprising:

a determination portion configured to:

determine a user-uttered speech volume based on input speech; and determine a user-uttered speech source direction, wherein the user-uttered speech source direction is determined based on a direction from a tip to a base of a user finger; and a display controller configured to:

control a display portion to display a display object and a first motion object that moves toward the displayed display object, wherein the display object and the first motion object are displayed based on:

the user-uttered speech volume that exceeds a speech recognizable volume, and the user-uttered speech source direction.

19. An information processing device, comprising:

a determination portion configured to:

determine a user-uttered speech volume based on input speech; and determine a user-uttered speech source direction;

determine a noise volume based on the input speech; and set a speech recognizable volume to a specific value based on the noise volume that is below a minimum limit; and a display controller configured to:

control a display portion to display a display object and a first motion object that moves toward the displayed display object, wherein the display object and the first motion object are displayed based on:

the user-uttered speech volume that exceeds the speech recognizable volume, and the user-uttered speech source direction.

* * * * *